US007617678B2

(12) United States Patent
Joergl et al.

(10) Patent No.: US 7,617,678 B2
(45) Date of Patent: Nov. 17, 2009

(54) EXHAUST THROTTLE-EGR VALVE MODULE FOR A DIESEL ENGINE

(75) Inventors: Volker Joergl, Ortonville, MI (US); Timm Kiener, Lake Orion, MI (US); Olaf Weber, Rochester Hills, MI (US); Bruce Thorpe, Magstadt (DE)

(73) Assignee: BorgWarner Inc., Auburn Hills, MI (US)

( * ) Notice: Subject to any disclaimer, the term of this patent is extended or adjusted under 35 U.S.C. 154(b) by 49 days.

(21) Appl. No.: 11/527,089

(22) Filed: Sep. 26, 2006

(65) Prior Publication Data

US 2007/0068500 A1 Mar. 29, 2007

Related U.S. Application Data

(63) Continuation-in-part of application No. 11/475,629, filed on Jun. 27, 2006, now abandoned, and a continuation-in-part of application No. PCT/US2006/004345, filed on Feb. 7, 2006.

(60) Provisional application No. 60/696,854, filed on Jul. 6, 2005, provisional application No. 60/650,752, filed on Feb. 7, 2005.

(51) Int. Cl.
*F02B 33/44* (2006.01)
*F02M 25/07* (2006.01)
*F16K 11/085* (2006.01)

(52) U.S. Cl. ............ 60/605.2; 123/568.24; 123/568.12; 137/625.47; 137/625.45

(58) Field of Classification Search ................ 60/605.2; 123/568.24, 568.12; 137/883, 625.4, 625.45, 137/625.46, 625.47, 875; 251/305, 297, 251/298
See application file for complete search history.

(56) References Cited

U.S. PATENT DOCUMENTS 2,991,804 A * 7/1961 Merkle .................. 137/625.47
3,721,265 A * 3/1973 Hoffland ................ 137/625.47
4,120,214 A 10/1978 Toda et al. ..................... 477/98
5,226,397 A 7/1993 Zabeck et al.
5,740,785 A 4/1998 Dickey et al. .............. 60/605.2
5,811,898 A 9/1998 Everingham (Continued)

FOREIGN PATENT DOCUMENTS

DE 2232705 7/1974

(Continued)

OTHER PUBLICATIONS

International Search Report with Written Opinion of the International Searching Authority, International Appln. No. PCT/US2006/004345.

*Primary Examiner*—Thai Ba Trieu
(74) *Attorney, Agent, or Firm*—Reising Ethington P.C.

(57) ABSTRACT

A valve assembly for use in an air management assembly having an engine, an exhaust side, and an intake side, where the valve assembly provides a housing, a plurality of openings in the housing, a valve in the housing, and an actuator operably connected to the valve. The housing is in fluid communication with the exhaust side and the intake side. The plurality of openings in the housing form at least one inlet and at least one outlet in the housing. The valve moves with respect to the plurality of openings.

74 Claims, 6 Drawing Sheets

U.S. PATENT DOCUMENTS

| | | | | |
|---|---|---|---|---|
| 5,893,392 | A * | 4/1999 | Spies et al. | 137/625.47 |
| 5,950,576 | A | 9/1999 | Busato et al. | 123/41.08 |
| 6,000,222 | A | 12/1999 | Regnier et al. | 60/605.2 |
| 6,089,019 | A | 7/2000 | Roby et al. | 60/605.2 |
| 6,089,212 | A | 7/2000 | Piock et al. | 123/568.2 |
| 6,164,248 | A | 12/2000 | Lehmann | 123/41.1 |
| 6,263,672 | B1 | 7/2001 | Roby et al. | 123/568.11 |
| 6,371,060 | B1 | 4/2002 | Lehmann et al. | 123/41.1 |
| 6,378,509 | B1 * | 4/2002 | Feucht et al. | 60/605.2 |
| 6,422,216 | B1 | 7/2002 | Lyko et al. | 123/568.11 |
| 6,422,223 | B2 | 7/2002 | Meilinger et al. | 123/568.21 |
| 6,651,634 | B2 | 11/2003 | Sari et al. | 123/568.23 |
| 6,726,174 | B2 | 4/2004 | Bareis et al. | 251/205 |
| 6,782,879 | B2 | 8/2004 | Duda et al. | 123/574 |
| 6,948,483 | B2 * | 9/2005 | Veinotte | 123/568.24 |
| 6,983,596 | B2 | 1/2006 | Frankenstein et al. | 60/602 |
| 6,997,170 | B2 | 2/2006 | Feiner et al. | 123/568.29 |
| 7,043,914 | B2 | 5/2006 | Ishikawa | 60/605.2 |
| 7,096,887 | B2 * | 8/2006 | Tupa et al. | 137/625.47 |
| 2001/0047798 | A1 * | 12/2001 | Kawasaki | 123/568.2 |
| 2006/0032485 | A1 | 2/2006 | Wilson et al. | 123/568.11 |
| 2006/0237675 | A1 | 10/2006 | Telep et al. | 251/129.11 |
| 2007/0125081 | A1 * | 6/2007 | Czarnowski et al. | 60/605.2 |

FOREIGN PATENT DOCUMENTS

| | | | |
|---|---|---|---|
| DE | 4332513 | A1 | 3/1995 |
| DE | 19812702 | A1 | 9/1999 |
| DE | 19941035 | A1 | 3/2000 |
| DE | 19904622 | A1 | 8/2000 |
| DE | 19932313 | A1 | 1/2001 |
| DE | 10025877 | A1 | 12/2001 |
| EP | 1 420 159 | A | 5/2004 |
| FR | 2724976 | A1 | 3/1996 |
| JP | 2002276405 | A * | 9/2002 |
| WO | WO 00/42305 | A | 7/2000 |
| WO | WO 2006/056279 | A | 6/2006 |
| WO | WO2006084867 | A1 | 8/2006 |
| WO | WO2006092401 | A1 | 9/2006 |

* cited by examiner

EXHAUST THROTTLE-EGR VALVE MODULE FOR A DIESEL ENGINE

CROSS-REFERENCE TO RELATED APPLICATIONS

This application is a continuation-in-part of Non-Provisional application No. 11/475,629, filed Jun. 27, 2006, which was a continuation-in-part of PCT Application No. PCT/US06/04345, filed Feb. 7, 2006, and a continuation-in-part of PCT Application No. PCT/US06/04345, filed Feb. 7, 2006, which both claim the benefit of U.S. Provisional Application No. 60/696,854, filed Jul. 6, 2005 and Provisional Application No. 60/650,752, filed Feb. 7, 2005.

FIELD OF THE INVENTION

The present invention relates to an exhaust gas module that directs gaseous fluid to a plurality of openings.

BACKGROUND OF THE INVENTION

Due to both federal and state regulations, motorized vehicles today are limited to the amount of emissions in which they can release during operation. One way of reducing the amount of emissions released by the vehicle is to include an air management assembly having an exhaust gas recirculation (EGR) valve. The EGR valve directs at least a portion of the gaseous fluid from an exhaust manifold of the engine, so that the gaseous fluid is recirculated into an intake manifold of the engine along with fresh air. The EGR valve is controlled by an actuator in order to control the amount of gaseous fluid passing through the EGR valve and being recirculated into the intake manifold.

Further, an exhaust gas throttle valve is typically placed in the air management assembly which further controls the amount of gaseous fluid that passes through an EGR path to be recirculated in to the intake manifold or through an exhaust pipe to exit the air management assembly. Thus, the EGR valve and the exhaust gas throttle both control the amount of gaseous fluid recirculating through the intake side of the air management assembly, but are separate components and are separately controlled.

Therefore, it would be desirable to develop a module which provides a housing having a plurality of openings with a valve that controls the amount of gaseous fluid passing through the openings so that a valve controlled by a single actuator can replace the separate EGR valve and the exhaust gas throttle valve, and control the amount of gaseous fluid flowing through the EGR path and to the exhaust pipe.

SUMMARY OF THE INVENTION

An embodiment of the present invention relates to a valve assembly for use in an air management assembly having an engine, an exhaust side, and an intake side, where the valve assembly provides a housing, a plurality of openings in the housing, a valve in the housing, and an actuator operably connected to the valve. The housing is in fluid communication with the exhaust side and the intake side. The plurality of openings in the housing form at least one inlet and at least one outlet in the housing. The valve moves with respect to the plurality of openings.

Another embodiment of the present invention relates to a valve assembly for use in an air management assembly having an engine, an exhaust side, and an intake side, where the valve assembly provides a housing, an exhaust gas recirculation (EGR) cooler, an air intake, a compressor, a plurality of openings, a valve in the housing, and an actuator operably connected to the valve. The housing is in fluid communication with the exhaust side and the intake side. The EGR cooler is in fluid communication with the exhaust side. The air intake forms at least a portion of the intake side. The compressor is in fluid communication between the engine and the air intake. The plurality of openings form at least one inlet and at least one outlet. A first inlet is in fluid communication with the EGR cooler. A second inlet is in fluid communication with the air intake. An outlet is in fluid communication with the compressor. The valve in the housing moves with respect to the plurality of openings.

Another embodiment of the present invention relates to a valve assembly for use in an air management assembly having an engine, an exhaust side, and an intake side, where the valve assembly provides a housing, an EGR cooler, a charge air cooler, a plurality of openings in the housing, a valve in the housing, and an actuator operably connected to the valve. The housing is in fluid communication with the exhaust side and the intake side. The EGR cooler is in fluid communication with the exhaust side. The charge air cooler forms at least a portion of the intake side. The plurality of openings in the housing form at least one inlet and at least one outlet. A first inlet is in fluid communication with the EGR cooler. A second inlet is in fluid communication with the charge air cooler. The outlet is in fluid communication with the engine. The valve in the housing moves with respect to the plurality of openings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
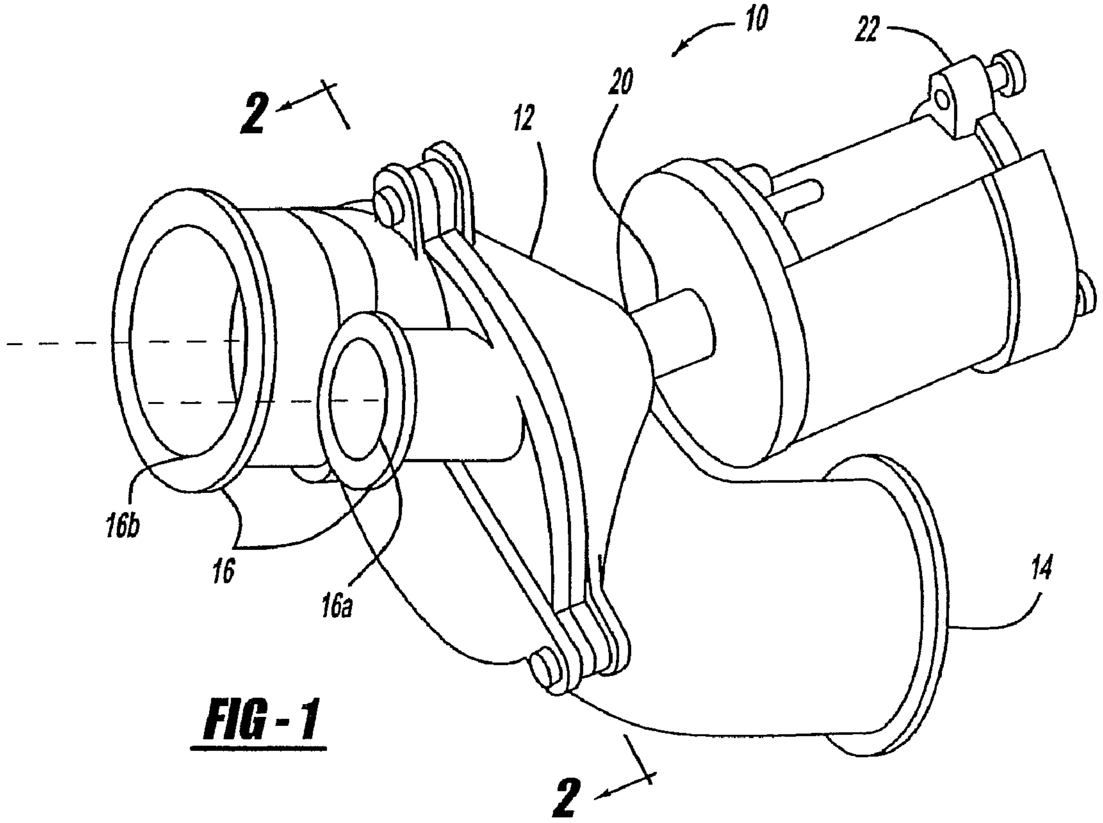
FIG. 1 is a perspective view of an exhaust throttle-exhaust gas recirculation module in accordance with a preferred embodiment of the present invention.
Figure 2:
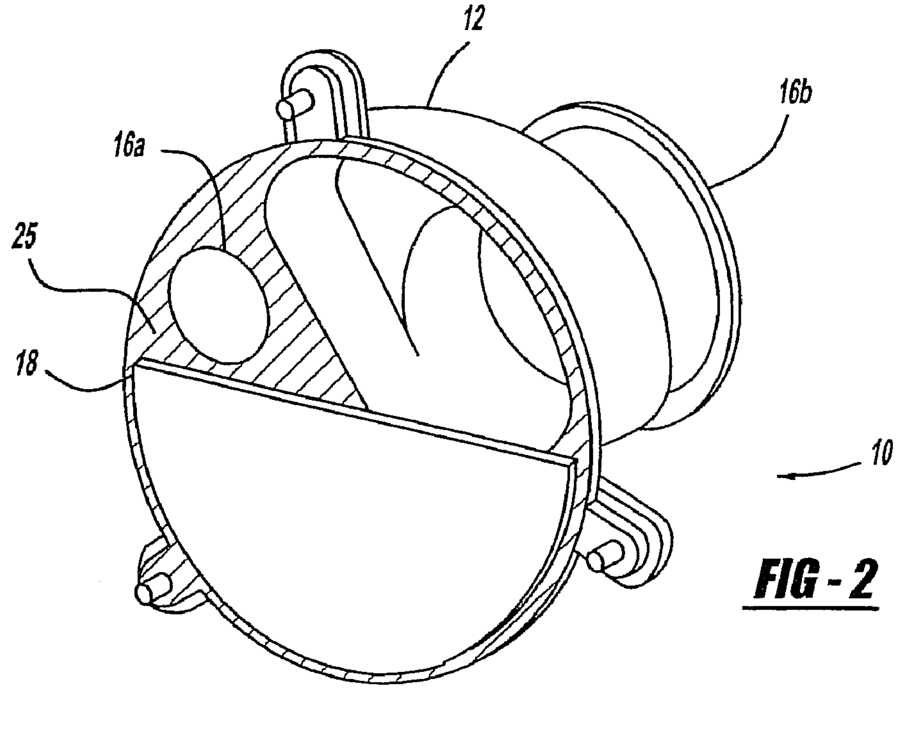
FIG. 2 is a cross-sectional perspective view of a valve and a plurality of openings of a housing in accordance with a preferred embodiment of the invention.

The following description of the preferred embodiment(s) is merely exemplary in nature and is in no way intended to limit the invention, its application, or uses.

Referring to FIGS. 1-3, 5, and 6, a valve assembly or an exhaust throttle-exhaust gas recirculation valve module (ETVM) is generally shown at 10. The ETVM 10 has a housing 12 with a plurality of openings. The openings form at least one inlet 14 and at least one outlet 16. In a preferred embodiment, the housing 12 has one inlet 14 and two outlets 16. A first outlet 16*a* is an exhaust gas recirculation (EGR) path and a second outlet 16*b* is an exhaust path. The housing 12 also contains valve 18 which is used to direct the flow of gaseous fluid or exhaust gas inside the housing 12 by being placed in different positions with respect to the EGR path 16*a* and the exhaust path 16*b*.

A single actuator 20 is used to control the valve 18. In a preferred embodiment, the actuator 20 is operably connected to an electric motor 22 so that the actuator 20 alters the position of the valve 18 in the desired position with respect to the EGR path 16*a* and the exhaust path 16*b*. The use of a single actuator 20 to control a single valve 18 that directs the flow of gaseous fluid through both the EGR path 16*a* and exhaust path 16*b* is beneficial because of the reduction in the number of parts needed to operate the ETVM 10 when compared to an assembly using a separate EGR valve (not shown) and exhaust gas throttle valve (not shown). For example, if the EGR path 16*a* and exhaust path 16*b* had separate actuators, there would be an additional actuator and an additional power source to operate the additional actuator when compared to the ETVM 10. Thus, by using a single actuator 20, the manufacturing process is more efficient because less parts need to be produced and assembled.

In a preferred embodiment, the flow of gaseous fluid through the ETVM 10 is primarily controlled by the valve 18 being placed with respect to the EGR path 16*a*. Thus, as gaseous fluid flows into the housing 12 through the inlet 14, the valve 18 as controlled by the actuator 20, directs the gaseous fluid through either, both, or neither of the EGR path 16*a* and the exhaust path 16*b*. When the valve 18 is positioned so that the EGR path 16*a* is completely open, an amount of gaseous fluid passes through the EGR path 16*a* due to the pressure in the housing 12 and inlet 14 created by the gaseous fluid. However, to further increase the flow through the EGR path 16*a*, the actuator 20 positions the valve 18 to completely close the exhaust path 16*b*, which increases the back pressure of the gaseous fluid in the housing 12 and inlet 14. This increase in back pressure causes a greater amount of gaseous fluid to flow through the EGR path 16*a*. Further, the valve 18 can be placed in any position where the EGR path 16*a* and exhaust path 16*b* are fully open, closed, partially open, or any combination thereof, in order to obtain the desired amount of gaseous fluid flowing through the EGR path 16*a* and the exhaust path 16*b*.

Figure 7:
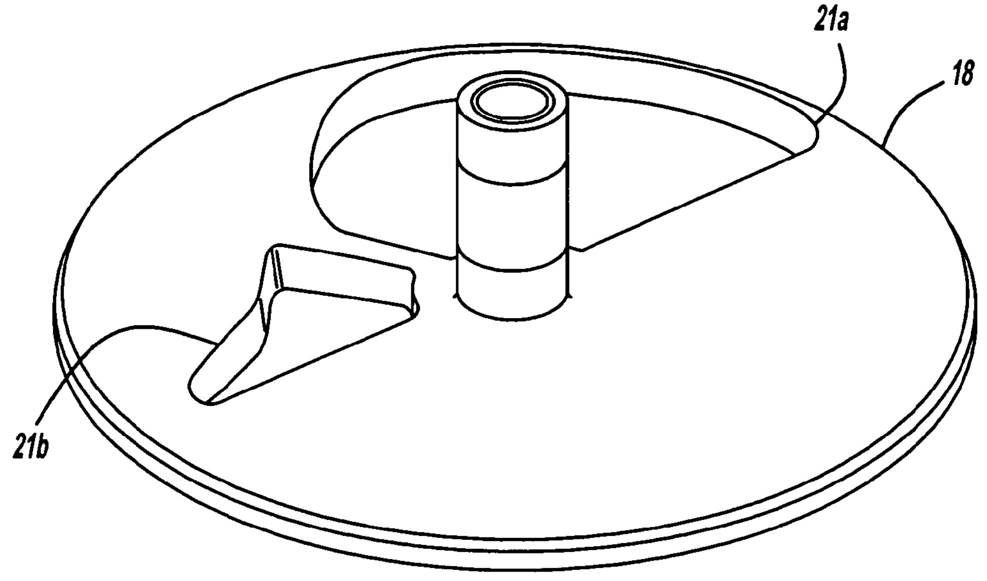
FIG. 7 is a perspective view of a valve used in an exhaust throttle-exhaust gas recirculation model in accordance with an embodiment of the present invention.
Figure 8:
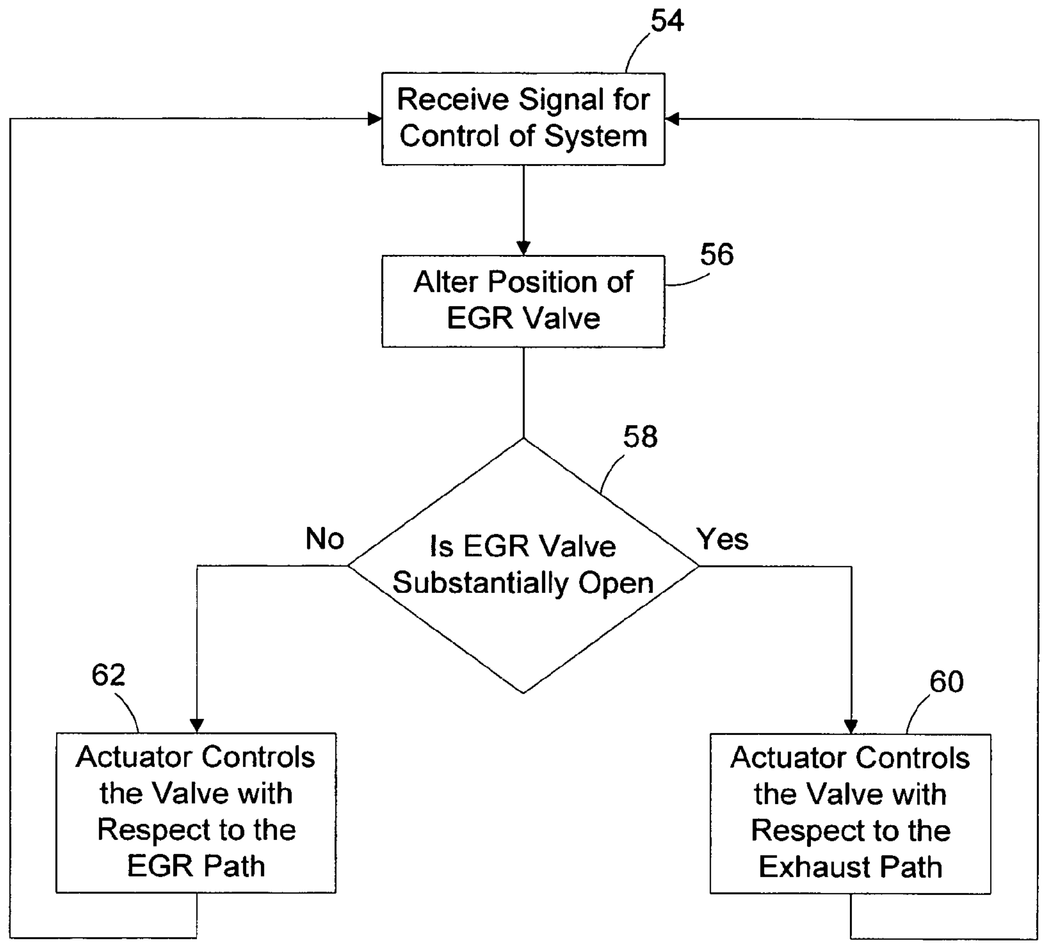
FIG. 8 is a block diagram of a method for controlling the flow of gaseous fluid through a plurality of openings using a single actuated valve.

In a preferred embodiment, the valve 18 is a disc that is angled with respect to the EGR path 16*a* and the exhaust path 16*b*. Thus, the valve 18 is operably connected to the actuator 20 and the valve rotates about the longitudinal axis of the housing 12 in order to close and open the EGR path 16*a* and the exhaust path 16*b* as desired. In reference to FIG. 7, a preferred embodiment of the valve 18 has a first orifice 21*a* and a second orifice 21*b*. The orifices 21*a*, 21*b* are shaped so that the valve 18, in conjunction with a fixed plate 25 in the housing 12, can fully open the inlets 14 and outlets 16, close the inlets 14 and outlets 16, partially open the inlets 14 and outlets 16, or any combination thereof. The first orifice 21*a* is larger than the second orifice 21*b* so that both the EGR path 16*a* and exhaust path 16*b* can be at least partially opened. The second orifice 21*b* is designed so that one of the EGR path 16*a* is at least partially open, and the exhaust path 16*b* is closed or vice versa. Further, the shape of the orifices 21*a*, 21*b* allow for an efficient flow of the gaseous fluid by reducing the amount of resistance caused by the valve 18 when compared to other valve 18 designs.

In an alternate embodiment, the valve 18 has a semi-circle disc shape so that the valve 18 is capable of being placed as to close the EGR path 16*a* and the exhaust path 16*b*, fully open the EGR path 16*a* and the exhaust path 16*b*, partially open the EGR path 16*a* and exhaust path 16*b*, or any combination thereof. Furthermore, the valve 18 has an aerodynamic angle in order to efficiently direct the flow of gaseous fluid to the desired location. Thus, the angle of the valve 18 is designed to reduce the amount of resistance applied to the gaseous fluid from the valve 18. It should be appreciated that any predetermined valve 18 design is capable of being placed with respect to the openings of the housing 12 in order to allow the gaseous fluid to flow through the housing 12 as described above.

Figure 3:
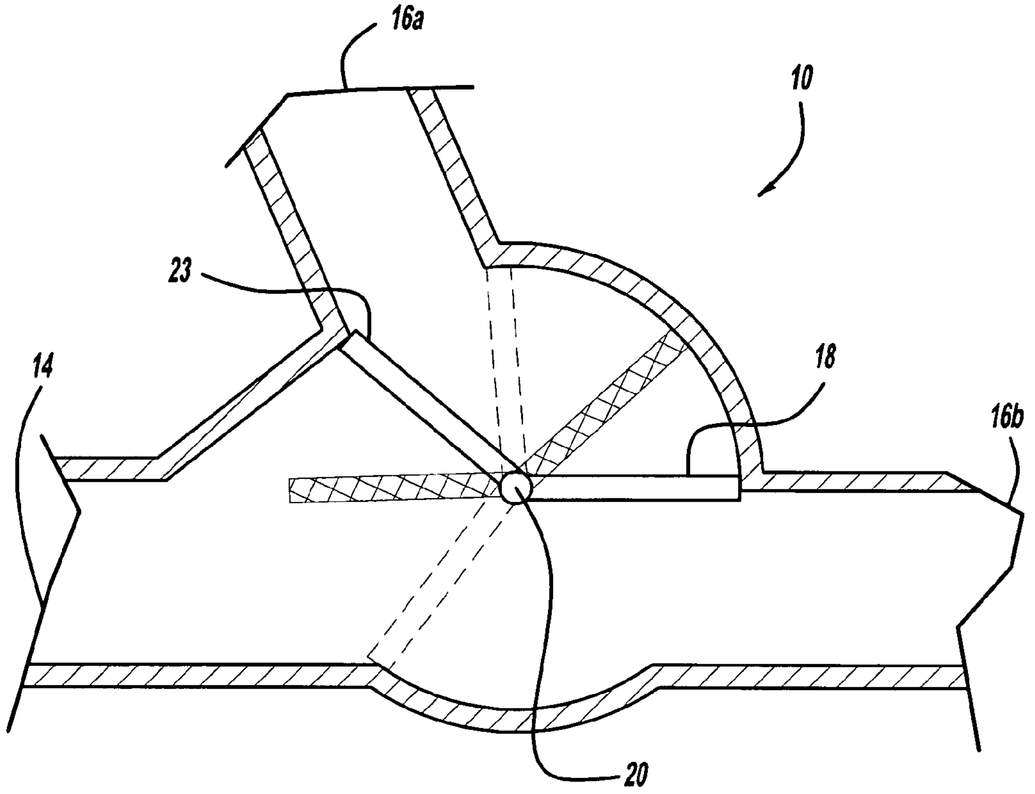
FIG. 3 is a side cross-sectional schematic view of the valve and plurality of openings of a housing in accordance with an alternate embodiment of the invention.

Referring to FIG. 3, in an alternate embodiment, the valve 18 rotates about a cross-sectional axis in order to close the EGR path 16*a* and exhaust path 16*b* as desired. Similar to the disc embodiment described above, the valve 18 can be a flapper, with a plurality of planes 23 extending from a point or the cross-sectional axis, so that the valve 18 is capable of being placed to close the EGR path 16*a* and exhaust path 16*b*, fully open the EGR path 16*a* and exhaust path 16*b*, partially open the EGR path 16*a* and exhaust path 16*b*, or any combination thereof. In addition, the valve 18 is designed with an aerodynamic angle in order to reduce the amount of resistance applied to the gaseous fluid by the valve 18.

In an alternate embodiment, the planes 23 extending from the point or cross-sectioned axis can be angled so that they do not extend directly radially from the point. The angled shape of the planes 23 is for the aerodynamic angle as stated above and/or to create a more efficient flapper design to open and close the openings in the housing 12 in a predetermined manner.

Figure 4:
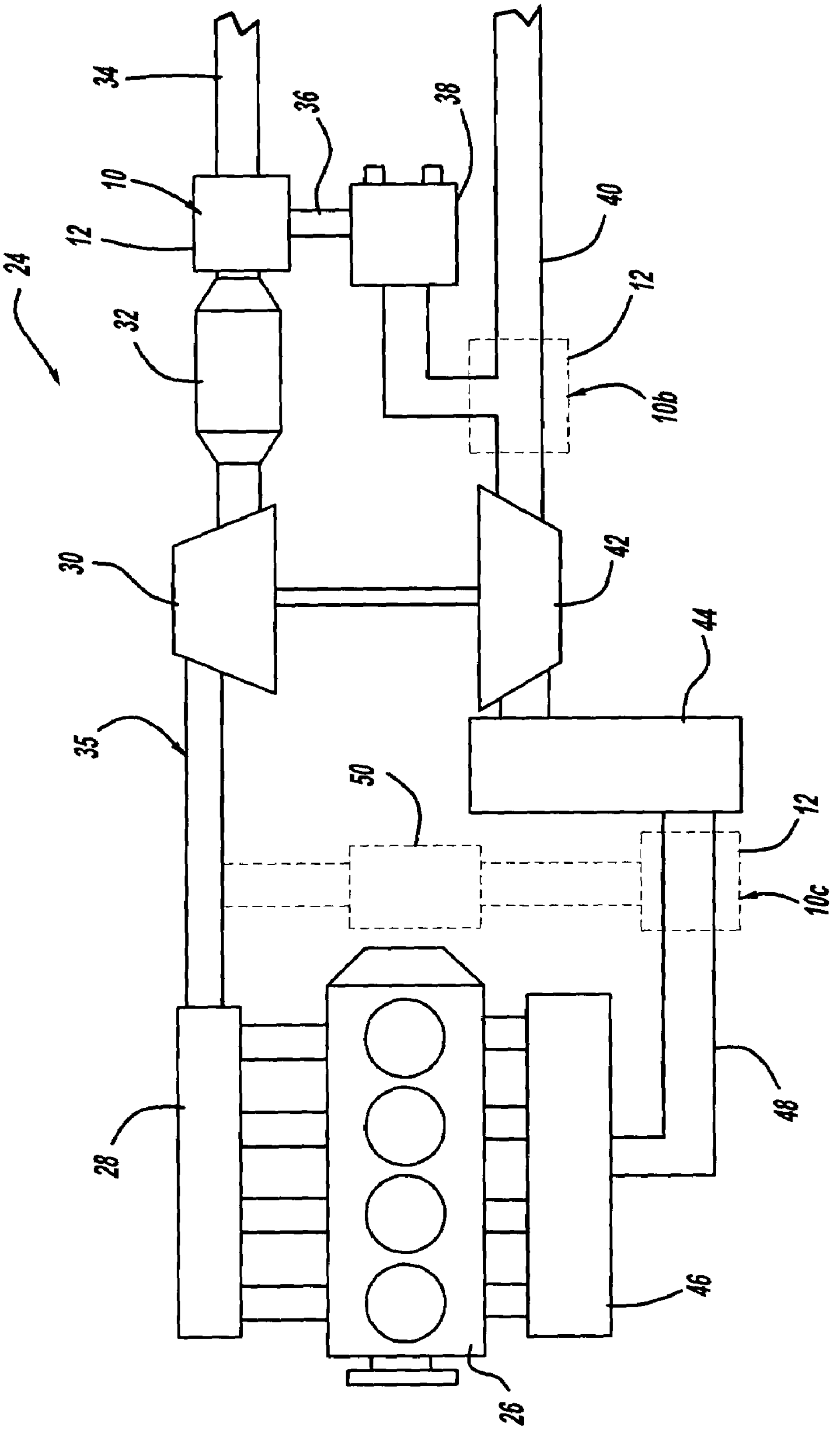
FIG. 4 is a schematic diagram of an air management assembly in accordance with an embodiment of the present invention, and alternate embodiments are shown in phantom where an exhaust throttle-exhaust gas recirculation module can alternatively be located in the air management assembly.

Referring to FIGS. 4, a preferred embodiment of an air management assembly including the ETVM 10 is generally shown at 24. Alternate embodiments of the air management assembly 24 are shown in phantom. With reference to FIGS. 1-7, an engine 26 has an exhaust gas manifold 28 where the gaseous fluid exits the engine 26. The gaseous fluid passes through the exhaust gas manifold 28 to a turbine 30. The gaseous fluid rotates the turbine 30. Thus, the turbine 30 is in fluid communication with the exhaust gas manifold 28. In a preferred embodiment, the gaseous fluid then passes through a diesel particulate filter (DPF) 32 and into the ETVM 10, so that the turbine 30, DPF 32, and ETVM 10 are in fluid communication with one another.

In one embodiment, the inlet 14 of the housing 12 of the ETVM 10*a* is directly connected to the outlet end of the DPF 32 in order to reduce the space occupied by the air management assembly 24. In addition, by having the direct connection between the ETVM 10*a* and the DPF 32 there is less leakage of gaseous fluid due to the reduction in connection points, which results in the prevention of a pressure drop of the gaseous fluid, and simplified assembly due to the reduction in parts.

Figure 5:
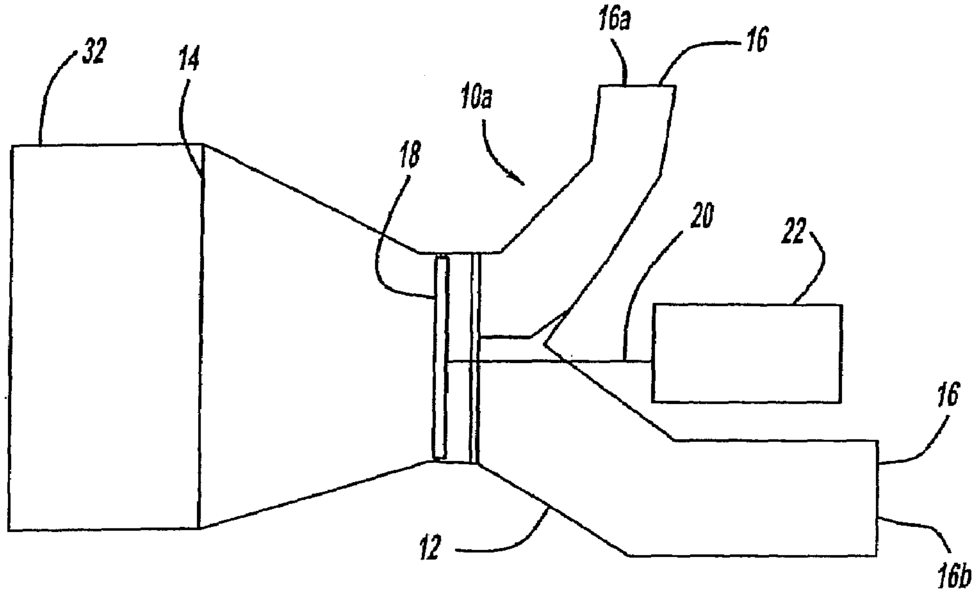
FIG. 5 is a cross-sectional schematic view of an exhaust throttle-exhaust gas recirculation module having an opening in a housing with a substantially similar diameter as a filter that is in fluid communication with the module in accordance with an embodiment of the invention.

With specific reference to FIG. 5, in a preferred embodiment when the ETVM 10*a* is directly connected to the DPF 32, the opening of the housing 12 that is connected to the DPF 32 has substantially the same diameter as the DPF 32. By having the inlet 14 that is substantially the same diameter as the DPF 32, the gaseous fluid has substantially the same area to flow through from the DPF 32 to the ETVM 10*a* rather than having a reduction in the area in which the gaseous fluid can flow creating a bottleneck, which results in a reduction of the gaseous fluid flow rate. Therefore, this design for connecting the ETVM 10*a* and the DPF 32 allows for an efficient flow of gaseous fluid through the two components.

With continued reference to FIGS. 1-7, no matter where the DPF 32 is located with respect to the ETVM 10, the gaseous fluid that enters the ETVM 10 through the inlet 14 is directed to pass through one, both, or neither of the EGR path 16*a* and exhaust path 16*b* as described above. The exhaust gas that passes through the exhaust path 16*b* then flows through an exhaust pipe 34 and is discharged from the engine assembly 24. Thus, the gaseous fluid remains on the exhaust side generally indicated at 35, until it exits the air management assembly 24. The exhaust side 35 includes at least the exhaust gas manifold 28, the turbine 30, the DPF 32, and the exhaust pipe 34.

The gaseous fluid that is directed through the EGR path 16*a* then passes through an EGR path 36 in the air management assembly 24, into a gaseous fluid cooler or EGR cooler 38 that is in fluid communication with the ETVM 10. After the gaseous fluid has passed through the EGR cooler 38, the gaseous fluid is combined with fresh air through an air intake 40. The mixture of gaseous fluid and fresh air then enters a compressor 42 where the pressure of the gaseous fluid mixture is increased. Thus, the EGR cooler 38, air intake 40, and compressor 42 are in fluid communication with one another. Typically, the compressor 42 is moveably coupled to the turbine 30, such that the gaseous fluid that rotates the turbine 30 causes the compressor 42 to rotate.

Once the gaseous fluid mixture has been compressed and exits the compressor 42, the gaseous fluid mixture passes through a gaseous fluid cooler or a charge air cooler 44 that is in fluid communication with the compressor 42. The charge air cooler 44 reduces the temperature of the gaseous fluid mixture. Then the gaseous fluid mixture flows into an intake manifold 46 of the engine 26 that is in fluid communication with the charge air cooler 44. Thus, the gaseous fluid mixes with the fresh air on an intake side 48 of the air management assembly 24 which includes at least the air intake 40, the compressor 42, the charge air cooler 44, and the intake manifold 46. In an alternate embodiment, the ETVM 10 is placed anywhere in the air management assembly 24 where it is beneficial to have an EGR valve and a control mechanism for altering the flow of gaseous fluid controlled by a single actuator 20.

Figure 6:
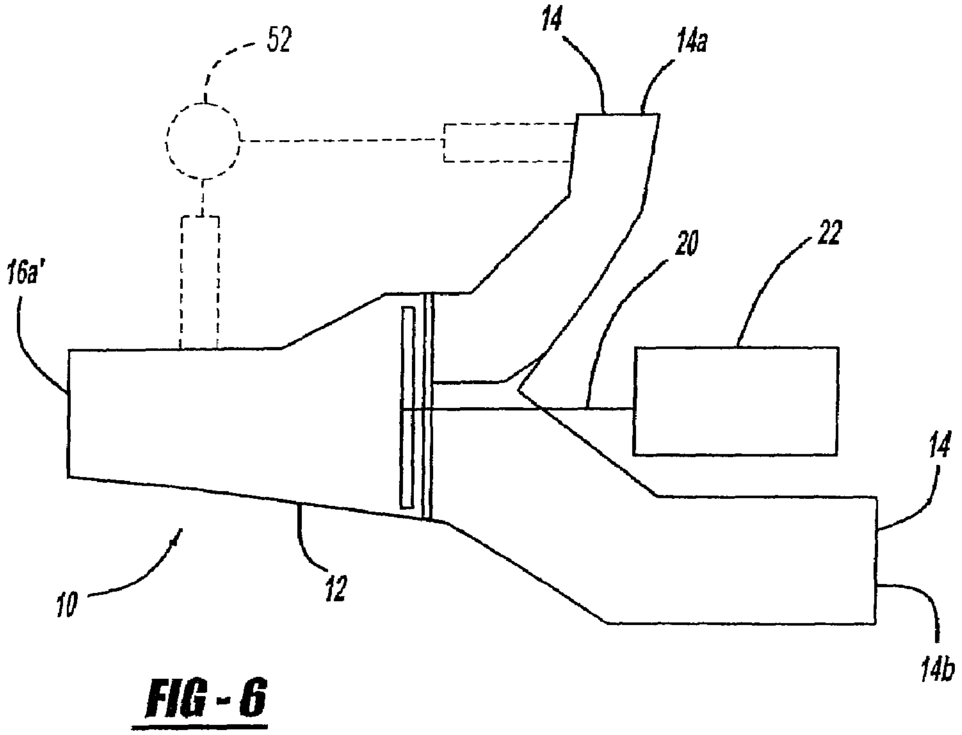
FIG. 6 is a cross-sectional schematic diagram of an exhaust throttle-exhaust gas recirculation module with an alternate feature shown in phantom in accordance with the present invention.

In reference to FIGS. 4 and 6, in an alternate embodiment, the ETVM 10*b* can be placed on the intake side 48 of the air management assembly 24. In this embodiment, a first inlet 14*a* in the housing 12 is in fluid communication with the exhaust side 35; thus, the inlet 14*a* relates to the EGR path 16*a* described above. In a preferred embodiment, the first inlet 14*a* is in fluid communication with the EGR cooler 38. The EGR cooler 38 is in fluid communication with the exhaust side 35 after the gaseous fluid passes through the turbine 30. A second inlet 14*b* in the housing 12 is in fluid communication with the air intake 40; thus, the second inlet 14*b* relates to the exhaust path 16*b* described above, except in this embodiment it is an intake path. The housing 12 also has a first outlet 16*a'* that is in fluid communication with the engine 26. In a preferred embodiment, the first outlet 16*a'* is in fluid communication with the compressor 42. Thus, the ETVM 10*b* forms at least a portion of the intake side 48. The valve 18 operates in the same manner as described above, except that the valve 18 is positioned with respect to the inlets 14*a* and 14*b* rather than the outlet 16*a'*; thus, the valve 18 can be positioned so that the first inlet 14*a* and second inlet 14*b* can be fully open, closed, partially open, or any combination thereof.

In another alternate embodiment, the ETVM 10*c* forms at least a portion of the intake side 48, so that the first inlet 14*a* is in fluid communication with a gaseous fluid cooler or an EGR cooler 50. Similar to above, the first inlet 14*a* relates to the EGR path 16*a*. However, ETVM 10*c* maintains the same design as ETVM 10*b* as described above and shown in FIG. 6. The EGR cooler 50 is in fluid communication with the exhaust side 35 prior to the gaseous fluid passing through the turbine 30. The second inlet 14*b* is in fluid communication with the charge air cooler 44. Similar to above, the second inlet 14*b* relates to the exhaust path 16*b*. The first outlet 16*a'* is in fluid communication with the engine 26. As stated above, for the embodiment where the ETVM 10*c* is on the intake side 48, the valve 18 functions in the same manner except the valve moves with respect to the inlets 14*a* and 14*b*.

In reference to FIG. 6, in an alternate embodiment the ETVM 10 has a pressure sensor 52 that is connected to at least two of the openings in the housing 12. This alternate embodiment is described with respect to ETVM 10 for example purposes only, and can be included on, but not limited to, any ETVM 10, 10*a*, 10*b*, 10*c* design. Preferably the openings the pressure sensor 52 is connected to are on opposite sides of the valve 18. The pressure sensor 52 can then determine the pressure difference between the openings on opposite sides of the valve 18. The pressure difference can then be used to determine how the actuator 20 should alter the position of the valve 18 in order to get the desired flow of gaseous fluid through the housing 12.

As described above, the valve 18 can be positioned in order to fully open the EGR path 16*a* and partially or fully close the exhaust path 16*b* in order to raise the back pressure of the gaseous fluid in the housing 12. Raising the pressure of the gaseous fluid in the housing 12 is beneficial when the engine 26 is being shut off or to raise the temperature of the gaseous fluid in the air management assembly 24. As described above, the single actuator 20 is used to control the valve 18 in order to position the valve 18 with respect to the EGR path 16*a* and the exhaust path 16*b*. Raising the back pressure of the gaseous fluid in this way is beneficial due to the increase in back pressure acting as an engine shut off. Thus, the increase in gaseous fluid back pressure increases the engine 26 load which causes the engine 26 to shut off. Further, the raise in temperature of the gaseous fluid is beneficial because the increased temperature acts as a catalyst to begin oxidation of the gaseous fluid during low driving cycles.

Referring to FIGS. 1-8, a method for controlling the amount of exhaust gas recirculation in a preferred embodiment of the air management assembly 24 provides a first step where the actuator 20 receives a signal from a control system at decision box 54. In a preferred embodiment, the control system is an engine control unit (ECU) (not shown), and the ECU is programmed to determine the desired valve 18 location and/or the gaseous fluid flow through the ETVM 10, 10*a*, 10*b*, 10*c*. In an alternate embodiment, the control unit is the actuator 20, which acts similar to the ECU described above in that the actuator 20 determines the desired location of the valve 18 and/or the gaseous fluid flow through the ETVM 10, 10*a*, 10*b*, 10*c* and adjusts the valve 18 accordingly. In either of the two embodiments described above, the ECU or the actuator 20 typically receives signals from a position sensor (not shown), a pressure sensor 52, a mass air flow sensor, or the like, to determine the current location of the valve 18. It should be appreciated that any type of sensor can be used, so long as the adjustment to the ETVM 10, 10*a*, 10*b*, 10*c* is determined in order to obtain the desired output from the ETVM 10, 10*a*, 10*b*, 10*c*.

After the actuator 20 has received a control signal, the actuator 20 alters the position of the valve 18 accordingly at decision box 56. Thus, depending on the amount of gaseous fluid that is to be directly released from the air management assembly 24, the actuator 20 positions the valve 18 to direct gaseous fluid through the EGR path 16*a*, 14*a* opening and the exhaust path 16*b* or relating second opening 14*b*. Next, at decision box 58, it must be determined if the valve 18 is positioned such that the EGR path 16*a*, 14*a* opening is substantially open. If it is determined that the EGR path 16*a*, 14*a* opening is substantially open, then at decision box 60 the actuator 20 controls the valve 18 in order to further increase the amount of gaseous fluid flowing through the EGR path 16*a*, 14*a* opening by closing the exhaust path 16*b* or relating second opening 14*b*. However, if it is determined that the EGR path 16*a*, 14*a* opening is not substantially open, then at decision box 62 the actuator 20 continues to control the valve 18 in order to control the amount of gaseous fluid flowing through the EGR path 16*a*, 14*a* opening and exhaust path 16*b* or relating second opening 14*b*. After both decision box 60 and 62, the method for controlling the amount of exhaust gas recirculation returns to decision box 54 so that the actuator 20 receives a signal in order to further control valve 18.

In a preferred embodiment, it is determined if the EGR path 16*a*, 14*a* opening is substantially open prior to altering the valve 18 with respect to the exhaust path 16*b* or relating second opening 14*b* because it is undesirable to increase the back pressure of the gaseous fluid to increase the flow of gaseous fluid through the EGR path 16*a*, 14*a* opening if the EGR path 16*a*, 14*a* opening is not substantially open. Thus, if the EGR path 16*a*, 14*a* opening is not substantially open, the valve 18 is placed to open the EGR path 16*a*, 14*a* opening to increase the flow of gaseous fluid through the EGR path 16*a*, 14*a* opening rather than increasing the back pressure. In a preferred embodiment, the valve 18 is placed so that the EGR path 16*a*, 14*a* opening is completely open prior to the valve 18 being placed with respect to the exhaust path 16*b* or relating second opening 14*b* to alter the flow of gaseous fluid through the EGR path 16*a*, 14*a* opening. However, it is within the scope of the invention to control the flow of gaseous fluid through the exhaust path 16*b* or relating second opening 14*b* prior to the valve 18 completely opening the EGR path 16*a*, 14*a*.

In an alternate embodiment for controlling the valve 18 in any of the embodiments of the air management assembly, the actuator 20 moves the valve 18 with respect to the openings in the housing 12, such that the opening related to the exhaust path 16*b* or relating second opening 14*b* is fully open until the opening relating to the EGR path 16*a*, 14*a* is fully open. Once the opening relating to the EGR path 16*a*, 14*a* is fully open, the valve 18 immediately begins to be repositioned by the actuator 22 to at least partially close the opening relating to the exhaust path 16*b* or relating second opening 14*b*.

In another alternate embodiment, the valve 18 moves with respect to the openings in the housing 12, so that the opening relating to the exhaust path 16*b* or relating second opening 14*b* and the opening relating to the EGR path 16*a*, 14*a* are both fully open for a predetermined period of time. After this predetermined period of time has expired, the valve 18 begins to be repositioned by the actuator 20 to at least partially close the opening in the housing 12 that relates to the exhaust path 16*b* or relating second opening 14*b*.

In another alternate embodiment, the valve 18 moves with respect to the openings in the housing 12, so that the valve 18 begins to be repositioned by the actuator 20 to at least partially close the opening in the housing 12 that relates to the exhaust path 16*b* or relating second opening 14*b* from being in a fully open position when the valve 18 is in a predetermined position with respect to the opening that relates to the EGR path 16*a*, 14*a*. Typically, this predetermined valve 18 position with respect to the opening that relates to the EGR path 16*a*, 14*a* is a position where the opening that relates to the EGR path 16*a*, 14*a* is not fully opened.

In addition, an alternate embodiment of the air management assembly 24 can include a fail safe for the ETVM 10, 10*a*, 10*b*, 10*c* for situations where the actuator 20 malfunctions. When the fail safe is implemented and the actuator 20 malfunctions, the actuator 20 places the valve 18 in a predetermined position. Typically, the predetermined position is where the opening in the housing 12 that relates to the EGR path 16*a*, 14*a* is substantially or fully open, and the opening in the housing 12 that relates to the exhaust path 16*b* or relating second opening 14*b* is partially open.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:

providing a system comprising a valve assembly for use with an assembly for a combustion engine, said valve assembly comprising a housing, said housing having a plurality openings for the controlled flow of gas therethrough, a valve in said housing; and an actuator operably connected to said valve and constructed and arranged to move said valve with respect to said openings to control the flow of gas therethrough, the gas comprising combustion engine exhaust, and wherein said openings comprising a first opening comprising a first inlet or a first outlet, a second opening comprising a second inlet or a second outlet, and a third opening comprising a first outlet or a first inlet;

causing said actuator to move said valve to a first position wherein said second opening is fully open and said first opening is partially closed, to a second position wherein both said first opening and said second opening are fully open, and to a third position wherein said first opening is fully open and said second opening is at least partially closed, and to a fourth position wherein both said first opening and said second opening are each at least partially closed.

2. The method as set forth in claim 1 wherein in the first position said first opening is fully closed.

3. The method as set forth in claim 1 wherein in the third position said second opening is fully closed.

4. The method as set forth in claim 1 wherein in the fourth position both said first opening and said second opening are fully closed.

5. The method as set forth in claim 1 wherein said system further comprises an exhaust manifold in fluid communication with said first opening, and an EGR path in fluid communication with said second opening, and an exhaust pipe in fluid communication with said third opening.

6. The method as set forth in claim 1 wherein said system further comprises an air intake in fluid communication with said first opening, an EGR path in fluid communication with said second opening, and an intake side in fluid communication with said third opening.

7. The product as set forth in claim 1 wherein said valve is a flapper valve.

8. A product comprising:

a valve assembly for use with an assembly for a combustion engine, said valve assembly comprising a housing, said housing having at least three openings for the controlled flow of gas therethrough, a valve in said housing, said valve comprising at least a portion of a disc; and an actuator operably connected to said valve and constructed and arranged to move said valve with respect to said openings to control the flow of gas therethrough and wherein said valve is moveable to a position wherein each opening is fully open and without any obstruction.

9. The product of claim 8, wherein said valve is disc shaped and has at least one orifice so that said valve is moveable to a plurality of positions with respect to said openings in said housing in order for said openings to be at least one of fully open, at least partially closed, or a combination thereof.

10. The product of claim 8, wherein said openings comprise at least one inlet and two outlets including a first outlet and a second outlet, or at least one outlet and two inlets including a first inlet and a second inlet, said valve constructed and arranged to be moveable to at least a first position and a second position so that in the first position at least one of said first inlet and second inlet or at least one of said first outlet and said second outlet is fully open, and in the second position at least one of said first inlet and second inlet or at least one of said first outlet and said second outlet is at least partially closed.

11. The product of claim 8, wherein said openings comprise at least a first inlet, a second inlet and a first outlet, and wherein said valve is constructed and arranged to move to at lease a first, a second and a third position, so that in the first position said second inlet is fully open and said first inlet is at least partially closed, and so that in the second position said second inlet is fully open and said first inlet is fully open, and so that in the third position said second inlet is at least partially closed and said first inlet is fully open.

12. The product of claim 8, wherein said openings comprise at least a first inlet, a second inlet and a first outlet, and wherein said valve is constructed and arranged to move to at lease a first and a second position, so that in the first position said first inlet and said second inlet are each fully open, and so that in the second position said first inlet is fully open and said second inlet is at least partially closed.

13. The product of claim 8, wherein said openings comprise at least a first inlet, a second inlet and a first outlet, and wherein said valve is constructed and arranged to move to a first position wherein both said first inlet and second inlet are fully open, to a second position wherein both said first inlet and said second inlet are each at least partially closed and to a third position wherein one of said first inlet and said second inlet is fully open and the other of said first inlet and said second inlet is at least partially closed.

14. The product of claim 8 wherein said openings comprise a first outlet, a second outlet and a first inlet, and wherein said valve is constructed and arranged to move to a first position wherein both said first outlet and second outlet are fully open, to a second position wherein both said first outlet and said second outlet are each at least partially closed and to a third position wherein one of said first outlet and said second outlet is fully open and the other of the said first outlet and said second outlet is at least partially closed.

15. The product of claim 8 further comprising a pressure sensor connected to a plurality of openings in said housing on opposite sides of said valve.

16. The product as set forth in claim 8 wherein said valve is a disc having a semi-circle shape.

17. The product as set forth in claim 16 wherein said disc is constructed and arranged so the gas flows pass said disc.

18. The product as set forth in claim 17 wherein said disc is solid and is constructed and arranged so that gas does not flow through the said disc.

19. A product comprising:

a valve assembly for use with an assembly for a combustion engine, said valve assembly comprising a housing, said housing having a plurality of openings in said housing, said openings comprising at least one inlet and two outlets including a first outlet and a second outlet, or at least one outlet and two inlets including a first inlet and a second inlet;

a valve in said housing, said valve comprising at least a portion of a disc; and an actuator operably connected to said valve and constructed and arranged to move said valve with respect to said openings to control the flow of gas therethrough and wherein said valve is moveable to completely close each inlet and outlet.

20. The product of claim 19, further comprising an exhaust side for the combustion engine, and wherein the at least one inlet or one of the two inlets in said housing is in fluid communication with said exhaust side.

21. The product of claim 20 further comprising an exhaust gas recirculation (EGR) cooler in fluid communication between said exhaust side and said first outlet or said at least one outlet.

22. The product of claim 19, further comprising an air intake side for said combustion engine, and wherein said second inlet in said housing is in fluid communication with said air intake side.

23. The product of claim 22 further comprising a charge air cooler in fluid communication with said air intake and said second inlet.

24. The product of claim 19, further comprising an engine and wherein at least said first inlet or said at least one inlet in said housing is in fluid communication with said engine.

25. The product of claim 24 further comprising a compressor positioned downstream upstream said combustion engine.

26. The product of claim 19, wherein said valve is constructed and arranged to be moveable to at least a first position and a second position so that in the first position at least one of said first inlet and second inlet or at least one of said first outlet and said second outlet is fully open, and in the second position at least one of said first inlet and second inlet or at least one of said first outlet and said second outlet is at least partially closed.

27. The product of claim 19, wherein said valve is a flapper with a plurality of planes extending from a point so that said valve is moveable with respect to said openings in said housing in order for said openings to be at least one of fully open, at least partially closed, or a combination thereof.

28. The product of claim 19, wherein said valve is constructed and arranged to move to at lease a first, a second and a third position, so that in the first position said second inlet is fully open and said first inlet is at least partially closed, and so that in the second position said second inlet is fully open and said first inlet is fully open, and so that in the third position said second inlet is at least partially closed and first inlet is fully open.

29. The product of claim 19, wherein said valve is constructed and arranged to move to at lease a first and a second position, so that in the first position said first inlet and said second inlet are each fully open, and so that in the second position said first inlet is fully open and said second inlet is at least partially closed.

30. The product of claim 19, wherein said valve is constructed and arranged to move to a first position wherein both said first inlet and second inlet are fully open, to a second position wherein both said first inlet and said second inlet are each at least partially closed and to a third position wherein one of said first inlet and said second inlet is fully open and the other of said first inlet and said second inlet is at least partially closed.

31. The product of claim 19 wherein said valve is constructed and arranged to move to a first position wherein both said first outlet and second outlet are fully open, to a second position wherein both said first outlet and said second outlet are each at least partially closed and to a third position wherein one of said first outlet and said second outlet is fully open and the other of said first outlet and said second outlet is at least partially closed.

32. The product of claim 19 further comprising a pressure sensor connected to a plurality of openings in said housing on opposite sides of said valve.

33. The product of claim 19 further comprising a filter in fluid communication with said engine, wherein an opening of said housing is in fluid communication with said filter, and said opening has substantially the same diameter as said filter.

34. The product as set forth in claim 19 wherein said valve assembly is an exhaust gas recirculation valve assembly.

35. The product as set forth in claim 19 wherein only a single actuator is operable connected to said valve.

36. The product as set forth in claim 19 wherein an axis of said first inlet is substantially parallel to the axis of said second inlet.

37. The product as set forth in claim 19 wherein an axis of said first outlet is substantially parallel to the axis of said second outlet.

38. The product as set forth in claim 19 wherein said valve is a flapper valve.

39. The product as set forth in claim 19 wherein said valve is a disc having a semi-circle shape.

40. The product as set forth in claim 39 wherein said disc is constructed and arranged so the gas flows pass said disc.

41. The product as set forth in claim 40 wherein said disc is solid and is constructed and arranged so that gas does not flow through said disc.

42. A product comprising:

a valve assembly and a diesel particulate filter, said valve assembly comprising a housing, said housing having at least three openings for the controlled flow of gas therethrough, said openings comprising a plurality of inlets or a plurality of outlets, a valve in said housing;

an actuator operatively connected to said valve and constructed and arranged to move said valve with respect to said openings to control the flow of gas therethrough and wherein said valve is moveable to a position wherein each opening is fully open and without any obstruction;

the said diesel particulate filter being in fluid communication with one of said openings in said housing.

43. The product as set forth in claim 42 wherein said diesel particulate filter abuts said valve assembly.

44. The product as set forth in claim 42 wherein said diesel particulate filter has an exit opening having substantially the same size as one of said inlets in said housing.

45. The product as set forth in claim 42 further comprising an exhaust conduit interposed between said diesel particulate filter and said valve housing.

46. The product as set forth in claim 42 wherein said valve is a flapper with a plurality of generally planar substrates extending from a point so that said valve is moveable with respect to said openings in said first housing in order for said openings to be at least one of fully open, at least partially closed, or a combination thereof.

47. The product as set forth in claim 42 wherein said openings comprise at least one inlet and two outlets including a first outlet and a second outlet, or at least one outlet and two inlets including a first inlet and a second inlet.

48. The product as set forth in claim 47 wherein said valve comprises at least a portion of a disc constructed and arranged to be movable to at least a first position and a second position so that in the first position at least one of said first inlet and said second inlet or at least one of said first outlet and said second outlet is fully open, and in the second position at least one of said first inlet and said second inlet or at least one of said first outlet and said second outlet is at least partially closed.

49. A product comprising:

a valve assembly and a diesel particulate filter, said diesel particulate filter being directly connected to and abutting said valve assembly, said valve assembly comprising a housing having a plurality of openings formed in said housing, said openings comprising at least one inlet and two outlets including a first outlet and a second outlet;

a valve in said housing;

and an actuator operatively connected to said valve and constructed and arranged to move said valve with respect to said openings to control the flow of gas therethrough and wherein said valve is movable to completely close each inlet and outlet.

50. The product as set forth in claim 49 wherein said diesel particulate filter has an exit opening having substantially the same size as said at least one inlet.

51. A product comprising:

a valve assembly and a diesel particulate filter, said valve assembly comprising a housing, said housing having at least three openings for the controlled flow of gas therethrough, said openings comprising a plurality of inlets or a plurality of outlets, a valve in said housing; and an actuator operatively connected to said valve and constructed and arranged to move said valve with respect to said openings to control the flow of gas therethrough and wherein said valve is moveable to a position wherein each opening is fully open and without any obstruction;

said diesel particulate filter being in fluid communication with one of said openings in said housing and being directly connected to said valve assembly.

52. The product as set forth in claim 51 wherein said valve comprises at least a portion of a disc.

53. The product as set forth in claim 52 wherein said disc is constructed and arranged so the gas flows pass said disc.

54. The product as set forth in claim 53 wherein said disc is solid and is constructed and arranged so that gas does not flow through said disc.

55. A product comprising:

a combustion engine exhaust side and a combustion engine air intake side;

an air intake forming at least a portion of said intake side;

a valve assembly comprising a housing in fluid communication with said exhaust side and said intake side and a plurality of openings in said housing, said openings comprising at least one inlet and two outlets including a first outlet and a second outlet, or at least one outlet and two inlets including a first inlet and a second inlet;

a valve in said housing; and an actuator operably connected to said valve and constructed and arranged to move said valve with respect to said openings to control the flow of gas therethrough and wherein said valve is moveable to completely close each inlet and outlet.

56. The product of claim 55, wherein said valve is constructed and arranged to move to a first position wherein both said first outlet and second outlet are fully open, to a second position wherein both said first outlet and said second outlet are each at least partially closed, and to a third position wherein one of said first outlet and said second outlet is fully open and the other of said first outlet and said second outlet is at least partially closed.

57. The product of claim 55, wherein said valve is a flapper with a plurality of planes extending from a point so that said valve can be positioned with respect to said openings in said housing in order for said openings to be at least one of fully open, at least partially closed, or a combination thereof.

58. The product of claim 55, wherein said valve comprises at least a portion of a disc.

59. The product as set forth in claim 58 wherein said disc is constructed and arranged so the gas flows pass said disc.

60. The product as set forth in claim 59 wherein said disc is solid and is constructed and arranged so that gas does not flow through said disc.

61. The product of claim 55, wherein said valve comprises a disc having at least one orifice to allow the flow of gas therethrough.

62. The product of claim 55, wherein said valve assembly further comprises a fixed plate adjacent said valve, said fixed plate having at least an orifice for the flow of gas therethrough.

63. The product of claim 55 wherein said valve is constructed and arranged to move to a first position wherein both said first inlet and second inlet or both said first outlet and the second outlet are fully open, to a second position wherein both said first inlet and said second inlet or both said first outlet and said second outlet are each at least partially closed, to a third position wherein one of said first inlet and said second inlet or one of said first outlet and said second outlet is fully open and the other of said first inlet and said second inlet or said other of said first outlet and said second outlet is at least partially closed, and to a fourth position wherein both said first inlet and second inlet or first outlet and said second outlet are fully closed.

64. The product of claim 55 further comprising a pressure sensor connected to a plurality of openings in said housing on opposite sides of said valve.

65. The product as set forth in claim 55 wherein said first inlet is connected to a high pressure EGR path, said second inlet is connected to said air intake, and said first outlet is connected to said intake side.

66. The product as set forth in claim 55 wherein said first inlet is connected to said exhaust side, said first outlet is connected to a EGR path, and said second outlet is connected to an exhaust pipe.

67. The product as set forth in claim 55 wherein said first inlet is connected to a low pressure EGR path, said second inlet is connected to said air intake, and said first outlet is connected to said intake side.

68. The product as set forth in claim 55 wherein said valve is a flapper valve.

69. A product comprising:

a combustion engine breathing system comprising an air intake conduit, an exhaust conduit, a turbocharger extending between said air intake conduit and said exhaust conduit, said turbocharger comprising a turbine in fluid communication with said exhaust conduit and a compressor in fluid communication with said air intake conduit, a high pressure exhaust gas recirculation line connected to said exhaust conduit at a location upstream of said turbine and connected to said air intake conduit downstream of said compressor, a low pressure exhaust gas recirculation line connected to said exhaust conduit at a location downstream of said turbine and connected to said air intake upstream of said compressor, and a valve assembly comprising a housing, said housing having at least three openings for the controlled flow of gas therethrough, a valve in said housing, said valve comprising at least a portion of a disc; and an actuator operably connected to said valve and constructed and arranged to move said valve with respect to said openings to control the flow of gas therethrough and wherein said valve assembly is in fluid communication with said exhaust conduit downstream of said turbine.

70. The product as set forth in claim 69 wherein said valve assembly is located at the juncture of said exhaust conduit and said low pressure exhaust gas recirculation line.

71. The product as set forth in claim 69 wherein the valve is a disc having a semi-circle shape.

72. The product as set forth in claim 71 wherein said disc is constructed and arranged so the gas flows pass said disc.

73. The product as set forth in claim 72 wherein said disc is solid and is constructed and arranged so that gas does not flow through said disc.

74. A product comprising:

a valve assembly for use with an assembly for a combustion engine, said valve assembly comprising a housing, said housing having at least three openings for the controlled flow of gas therethrough, said openings comprising at least one inlet and two outlets including a first outlet and a second outlet;

a valve in said housing; and an actuator operably connected to said valve and constructed and arranged to move said valve with respect to said openings to control the flow of gas therethrough and wherein said valve is moveable to a first position wherein said valve fully closes said first outlet and is positioned to partially close said second outlet to throttle gas flowing through said second outlet and said valve is moveable to a second position wherein said valve fully closes said first outlet and is positioned to further close said second outlet to throttle gas flowing through said second outlet and so that the amount of gas flowing through said second outlet when said valve is in the second position is less than the amount of gas flowing through said second outlet when said valve is in the first position.

* * * * *

UNITED STATES PATENT AND TRADEMARK OFFICE

CERTIFICATE OF CORRECTION

PATENT NO. : 7,617,678 B2
APPLICATION NO. : 11/527089
DATED : November 17, 2009
INVENTOR(S) : Joergl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 101 days.

Signed and Sealed this

Nineteenth Day of October, 2010

David J. Kappos

*Director of the United States Patent and Trademark Office*